Oct. 3, 1933.  C. J. V. HENTSCHELL ET AL  1,929,114
AUTOMATIC BREAK WEB SWITCH AND CUTTER
Filed Sept. 24, 1930    3 Sheets-Sheet 1

Inventors
Charles J. V. Hentschell
George H. Wheldon
By their Attorneys
Merchant and Kilgore Oct. 3, 1933.   C. J. V. HENTSCHELL ET AL   1,929,114
AUTOMATIC BREAK WEB SWITCH AND CUTTER
Filed Sept. 24, 1930   3 Sheets-Sheet 3

Inventors
Charles J. V. Hentschell
George H. Wheldon
By their Attorneys
Merchant and [illegible]

UNITED STATES PATENT OFFICE 1,929,114

AUTOMATIC BREAK WEB SWITCH AND CUTTER

Charles J. V. Hentschell and George H. Wheldon, Minneapolis, Minn.

Application September 24, 1930
Serial No. 484,058

12 Claims. (Cl. 192—127)

This invention relates to cylinder printing presses or other machines which print or otherwise act upon a web of sheet paper or other material fed therethrough as the same is unwound from a roll.

It is now the custom to operate such machines by a double electric motor drive which includes an auxiliary motor for operating the machine at a slow rate of speed, a main motor for operating the machine at a high rate of speed and motor control mechanism therefor. The circuits for the double motor drive may lead from either an A. C. or a D. C. power line. The motor control mechanism includes a contact assembly and a pilot motor, the circuit of which leads from the power line and has a normally open switch, the successive closing of which causes said motor to impart steps of movement to the contact assembly, the first of which closes the circuit of the auxiliary motor and the machine is operated thereby at a slow rate of speed A second closing of the circuit of the pilot motor will impart a second step of movement to the contact assembly which breaks the circuit for the auxiliary motor and closes the circuit for the main motor and the machine is operated thereby at a high rate of speed. After the circuit for the main motor has been closed, the speed of said motor may be progressively increased, until the machine has reached its maximum or printing speed by repeatedly closing the circuit of the pilot motor which imparts successive steps of movement to the contact assembly. The motor control mechanism is provided with manually controlled means for reversing the pilot motor to reset the contact assembly in normal position wherein the circuits for the double motor drive are broken.

To thread a web through the machine, the same is operated at a slow rate of speed by the auxiliary motor and during this threading of the web, said motor is repeatedly started by closing its circuit and stopped by resetting the contact assembly.

At present, when a web breaks in a cylinder printing press, as the same is being fed thereto from a roll, it will so continue thereto until the press is stopped, causing, as a general rule, the web to wrap around the cylinders thus spoiling the blankets and often times the impression plates and causing delay in removing the broken web from the press.

One of the objects of this invention is to set in action, by the breaking of a web in a press or other machine, automatic means for breaking the circuit for the main motor so that the machine is stopped, causing an automatic reset of the contact assembly, and the severing of the web to stop further feeding thereof from its roll to the machine. This automatic means includes a master switch in the circuit of the main motor and an actuator for the same that is normally held inactive by the web in the machine.

The severing of the web is accomplished by a cutter controlled by electro-magnetic means in a circuit for the cutter having an automatic electric switch which receives its source of electrical energy from a circuit leading from the power line or other constant source and which circuit is provided with a contact that is operated by the actuator for the master switch at the time the web breaks. This cutter circuit, when the double motor drive circuits lead from an A. C. power line, receives its source of electrical energy directly from said power line. On the other hand, when the double motor drive circuits lead from a D. C. power line, the cutter circuit for the electro-magnetic means will be energized by a normally open shunt circuit between the armature terminals of the main motor.

Automatic means is provided for closing the shunt circuit, when the web breaks and releases the actuator held thereby for operating the master switch to open the main motor circuit so that the machine is stopped, to convert the main motor into a generator and use its dynamic force, while said motor and the machine are running under momentum, to energize the cutter circuit for the electro-magnetic means and cause the cutter to sever the web upon the breaking thereof.

The master switch and actuator are preferably of the same general type disclosed and broadly claimed in United States Letters Patent issued to C. J. V. Hentschell and William Hall, May 4, 1926, #1,582,927, with certain highly important improvements therein. In this device the actuator is held in an inoperative position, after a web has been broken, by the use of electro-magnetic means controlled by the circuit of the auxiliary motor, which is objectionable for the reason that the actuator remains in an operative position, after the web has broken, until the auxiliary motor is started and is thereafter operated each time the auxiliary motor is started and stopped during the threading of the web through the press. A further object of the invention is to overcome these objections by connecting the circuit of the electro-magnetic means for operating the actuator directly to the power line through the contact assembly where the same is normally closed and remains closed during the first step of movement imparted to said assembly by the pilot motor which, as previously stated, closes the circuit for the auxiliary motor and is only opened when the contact assembly is operated to open the circuit for the auxiliary motor and close the circuit for the main motor.

It will thus be seen that the circuit for the electro-magnetic means for operating the switch actuator is always energized and constantly holds the actuator out of contact with the web, except when the machine is being operated by the main motor. When the contact assembly is operated to break the circuit for the auxiliary motor and close the circuit for the main motor, the electro-magnetic means for the switch actuator is de-energized, releases the switch actuator and allows the same to move onto the travelling web and ride thereon.

In case the web breaks, the switch actuator held thereby will shift its position and operate the master switch to open the main motor circuit causing the automatic reset of the contact assembly that closes the circuit for the electro-magnetic means for the switch actuator which returns said actuator to its inoperative position and thus holds the same until the web has been re-threaded through the machine and said machine again operated by the main motor. The switch actuator, at the time it shifts its position by the breaking of the web, in addition to operating the master switch, also operates the contact in the circuit for the automatic electric switch which causes the cutter to sever the web.

The invention further provides manually controlled means for holding the actuator out of the plane of the web at all times whether the machine is stopped or running.

The invention still further provides other important novel features as will hereinafter appear.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Figs. 1 and 1ª are views showing in perspective a portion of a cylinder printing press and in diagram the wiring for its operating system, from a D. C. power line;

Fig. 4 shows a partial wiring diagram for the actuators, as shown in Figs. 1, 1ª and 3;

Fig. 5 is a view corresponding to Fig. 3 but showing mechanical means for holding the switch actuators inoperative.

Figure 1:
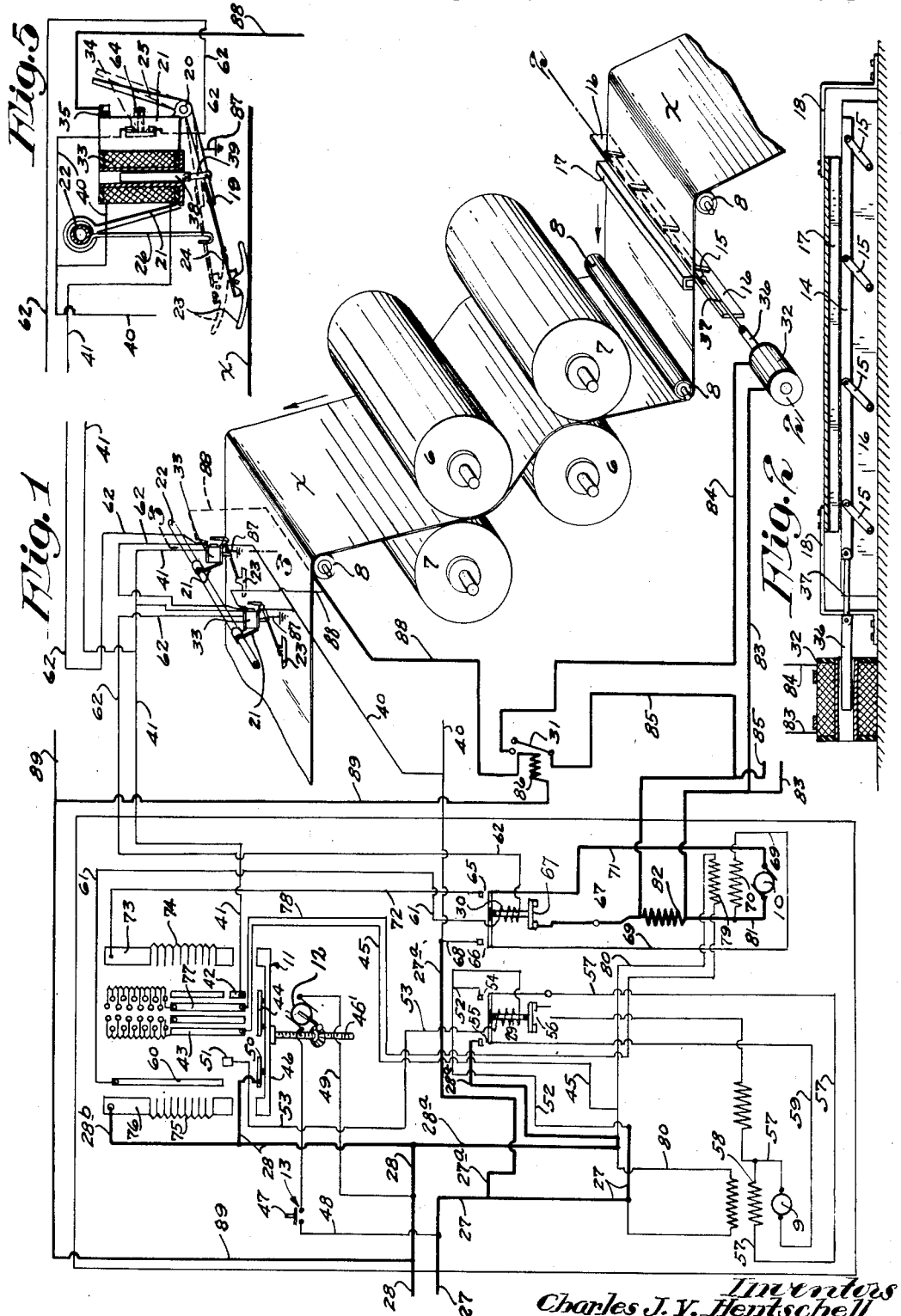
Figure 2:
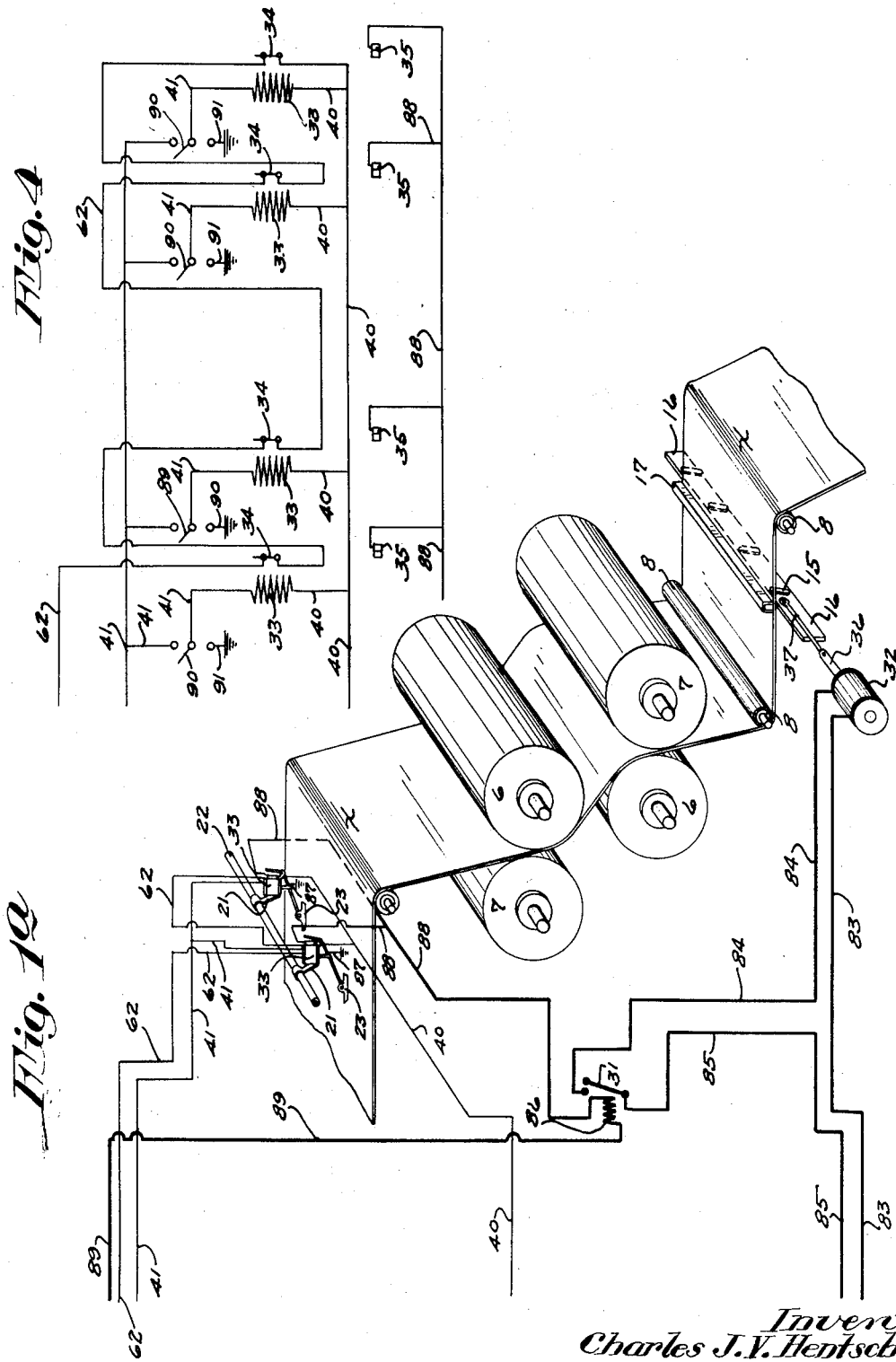
Fig. 2 is a view partly in elevation and partly in section taken on the line 2—2 of Fig. 1, on an enlarged scale.

Referring first to the invention shown in Figs. 1, 1ª, 2, 3, 4 and 5 which shows the wiring for the machine operating system from a D. C. power line.

*Cylinder printing press and web*

The cylinder printing press may have one or a plurality of printing units, as shown two, and any one or any number thereof may be operated, at will. As each unit, as far as this invention is concerned, is substantially identical the one with the other only one thereof will be described in detail for the sake of brevity.

Of the parts of the cylinder printing press, fragmentarily illustrated, the numerals 6 and 7 indicate the cylinders and the numeral 8 indicates the guide rolls of each unit. The cylinders 6 have mounted thereon curved metal impression plates which are inked and reproductions thereof made on a paper web X by the pressing action of the cylinders 7 against the cylinders 6 with the web X passing therebetween.

The cylinders 7 are covered with blankets which take the heavy imprint of the plates upon the web X. This web X is fed through the press in the direction of the arrows indicated in Fig. 1 as the same is unwound from a roll of paper, not shown. It can readily be seen that if the web X was permitted to wind around the cylinders 6 and 7 it would break down or flatten the plates and blankets and thus spoil the same.

*Double motor drive and contact assembly switch for press*

The press is first started by an auxiliary electric motor 9, of the double motor drive, which operates said press at a slow rate of speed and thereafter the press is operated by a main electric motor 10, of the double motor drive, which is stepped up until the press is operating at a high rate of speed, or, in other words, printing speed. The contact assembly switch 11, which is of well-known construction, and hereinafter referred to as the contact assembly for the sake of brevity, includes an electric pilot motor 12 by which it is operated. Normally the circuits for the motors 9 and 10 are broken through the contact assembly 11.

The pilot motor 12 is operated by impulses produced by closing a yieldingly opened switch 13 in its circuit to impart steps of movement to the contact assembly 11. The first step of movement of the contact assembly 11 closes the circuit for the auxiliary motor 9 and its second step of movement breaks the circuit for the auxiliary motor 9 and closes the circuit for the main motor 10.

The contact assembly 11 is provided with manually controlled means for reversing the pilot motor 12 to reset the contact assembly or, in other words, return said contact assembly to normal position. As the mechanism for reversing the pilot motor 12 forms a well-known part of the contact assembly 11, it is thought that the above statement will be sufficient without illustrating the same.

It may be here stated that the press is operated at a slow rate of speed by the auxiliary motor 9 during the threading of a web therethrough.

*Web cutter*

The web cutter, as shown, is a knife 14 provided for severing the web X in case it breaks, between the roll of paper and the first set of cylinders 6 and 7 which, as shown, is between the two lower guide rolls 8. The knife 14 extends transversely of and under said web and is somewhat longer than the full width thereof. This knife 14 is carried by a plurality of parallel oblique links 15 for raising and lowering movements. These links 15 are pivoted at their upper ends to the knife 14 and at their lower ends to a fixed support 16 on the press. Normally the knife 14 is gravity held in an inoperative position below the web X and can not be operated accidentally.

Cooperating with the knife 14 is a fixed bar 17 which extends over said knife with the web X extending loosely therebetween. The bar 17 is carried by a pair of brackets 18 on the press and affords a base of resistance for the web X during the cutting thereof by the knife 14 and has a groove into which the cutting edge of said knife extends as the web X is severed.

Web controlled switch actuator

Automatic means are set in action by a switch actuator 19 for stopping the main motor 10 and operating the knife 14 to sever the web X in case it breaks. This automatic means includes opening the circuit for the main motor 10 and closing a shunt between its armature terminals to convert said motor into a generator and using its dynamic force, while said motor is running under momentum, to operate the knife 14 and sever the web X.

The actuator 19, as shown, includes a bellcrank lever 20 pivoted at its knee to a bracket 21 carried by a transverse pipe 22 on the press for vertical swinging movement. One arm of the lever 20, which is relatively long, extends longitudinally over the web X in the direction of its travel through the press and has on its outer end a shoe 23 pivoted thereto for vertical swinging movement. This shoe 23 normally rests on the web X, is supported thereby and holds the actuator 19 inactive. The bottom of the shoe 23 is convex, longitudinally of the web X, so that said web freely slips thereunder.

This long arm of the lever 20 has a yielding or spring section 24 for the proper tension on the web X. The other arm 25 of the lever 20, which is relatively short, extends upright and is arranged to open a normally closed master switch for the main motor 10 and close a manually open contact for an automatic electric switch for the cutter circuit, as will hereinafter appear.

The web X normally holds the shoe 23 raised with the arm 25 in an inoperative position in respect to the above noted master switch and contact. In case the web X breaks the shoe 23 drops by gravity and thereby operates the bellcrank lever 20 to cause its arm 25 to open the master switch and close the contact.

In some instances, as will hereinafter appear, the actuators 19 may be individually held inactive by electrically operated means, as shown in Figs. 1, 1ª, 3 and 4 or mechanically by a hook 26 on the pipe 22, as shown in Fig. 5.

Wiring

The wiring includes lead wires 27 and 28 of a D. C. power line, from any suitable source of electrical energy, a relay 29 in the circuit of the auxiliary motor 9, a relay 30 in the circuit of the main motor 10, a normally open automatic electric switch 31 and a solenoid 32 in a dynamic circuit for the knife 14, a solenoid 33 in a circuit for operating the actuator 19, a normally and yieldingly closed master switch 34 in the circuit of the main motor 10 and a yielding and normally opened contact 35 in a circuit for energizing the switch 31.

It may be here stated that in case the web X breaks the released actuator 19, through its arm 25, will open the master switch 34 and close the contact 35.

The plunger 36 of the solenoid 32 is connected by a link 37 to the knife 14 for raising the same by means of the links 15 to sever the web X when the solenoid 32 is energized. The oblique links 15 permit the knife 14 to drop by gravity to an inoperative position below the web X and retract the plunger 36 of the solenoid 32 when said solenoid is de-energized.

The plunger 38 of the solenoid 33 is connected by a link 39 to the long arm of the bell-crank 20 intermediate of its ends and moves the actuator 19 into an inoperative position when the solenoid is energized.

It is thought that the balance of the wiring will be best understood by following the same during a description as to the operation of the invention.

It may be assumed that the press is idle, the web X is in the press ready for printing action, the knife 14 is retracted below the web X and all circuits broken from the lead wires 27 and 28 except a shunt field circuit and the circuit for the solenoid 33 which is closed and the energized solenoid 33 holds the actuator 19 inoperative with its shoe 23 raised above the web X, as indicated by broken lines in Fig. 3. The circuit for the solenoid 33 is from the lead wire 27 and its branch wire 27ª through wire 40 to the solenoid 33 from said solenoid through wire 41 to contact 42 from thence to contact 43 through movable contact 44 and from contact 43 through wire 45 to lead wire 28 through its branch wire 28ª. The contacts 42, 43 and 44 form a part of the contact assembly 11 and the contact 44 is carried by and insulated from the sliding bar 46 of said assembly.

To start printing action the pressman pushes button 47 to close switch 13 and complete circuit for pilot motor 12 from lead wire 27 through wire 48, in which said switch is interposed, to motor 12 and from said motor through wire 49 to lead wire 28 causing motor to operate. This starting of the pilot motor 12 imparts the first step of movement to the sliding bar 46 of contact assembly 11, through any suitable type of driver, as shown, a worm and gear 46' and performs two distinct functions.

First, energizes relay 29 of auxiliary motor 9 by closing the contacts 50 and 51, the former of which is carried by the sliding bar 46 and insulated therefrom, to complete circuit from lead wire 27 through wire 52 to relay 29 and from said relay through wire 53 to contact 51 from thence to contact 50 which is connected to the lead wire 28.

Second, energized relay 29 closes its contacts 54 and 55 and opens its contact 56 which closes circuit for auxiliary motor 9 from wire 52 through contacts 54 and wire 57 to series field 58 thence through wire 59 and closed contacts 55 one of which is connected to lead wire 28 by its branch 28ª, thus starting auxiliary motor 9 which operates press at a slow rate of speed.

In case it is necessary to thread the web X through the press the operation will be performed at this time and necessitate during the threading thereof the starting of the pilot motor 12 by closing its switch 13 and stopping said motor by reversing the same as heretofore referred to to reset the contact assembly 11 which returns the bar 46 to normal position and separates the contacts 50 and 51, which breaks the circuit of the auxiliary motor 9. During the resetting of the contact assembly 11 the contact 44 simply slides on the contacts 42 and 43 without breaking the circuit for the solenoid 33 so that said solenoid remains energized during the starting and stopping of the auxiliary motor 9 and the shoe 23 is constantly held above the web X.

The auxiliary motor 9 is now operating the press at a slow rate of speed and in case it was necessary to thread the web X through the press, it may be assumed that the process is now complete and said press is ready to be operated at printing speed.

To change the operation of the press from the auxiliary motor 9 to the main motor 10, the pressman again pushes button 47 to close switch 13 and complete circuit for pilot motor 12 causing the same to impart a second step of movement to the sliding bar 46 that moves the contact 44 out of engagement with the contact 42 which breaks the solenoid circuit, de-energizing the solenoid 33 thus releasing its plunger, and hence, the actuator 19 which moves under the action of gravity and positions its shoe 23 on the moving web X to ride thereon and which web still holds the actuator 19 inoperative. The spring section 24 in the long arm of the bell-crank 20 cushions the action of the shoe 23 as the same is dropped onto the web X.

This second step of movement of the sliding bar 46 also moves the contact 50 out of engagement with the contact 51 which breaks the circuit for the auxiliary motor 9 and closes the relay circuit for the main motor 10 by moving the contact 50, which is connected to lead wire 28, into engagement with the contact 60. This relay circuit from contact 60 is through wire 61 to relay 30 and from thence through wire 62 to the normally and yieldingly closed master switch 34 and from thence through wire 40 to lead wires 27 and 27ª.

A push button 64 is arranged to be operated by the arm 25 of the actuator 19 to open the master switch 34 when said actuator is released by the breaking of the web X, as will presently appear. Energized relay 30 closes its contacts 65 and 66 and opens its contacts 67, thus closing circuit for main motor 10 from wire 27 through its branch wire 27ª and wire 68 to closed contact 66 and thence through wire 69 through series field 70 to main motor 10 from said motor through wire 71 through closed contacts 65 and thence through wire 72 to plate contact 73, resistances and contacts 74, sliding bar 46, resistances and contacts 75 to plate contact 76 connected to lead wire 28 through its branch wire 28ᵇ.

The press is being operated by the main motor 10 at normal or printing speed and the shoe 23 is riding on the web X. It may be assumed that the web X breaks releasing the shoe 23 which drops by gravity and carries with it the long arm of the actuator 19 which swings the short arm 25 thereof against the push button 64 and operates the same to open the master switch 34 and break the circuit to main motor 10 through wire 62 to relay 30 and thereby causing contacts 65 and 66 to open and contact 67 to close, as previously stated.

After the circuit to the main motor 10 has been broken, there is momentum in the press which continues to revolve the armature of said motor until the press stops. This momentum of the revolving armature is used by converting the main motor 10 into a generator and using its dynamic force to operate the knife 14 and sever the web X at the time the same is broken to prevent its winding on the cylinders.

The main motor 10 has a shunt field, the circuit of which is always closed and leads through wire 45 from lead wire 27 to contact 43 through sliding contact 44 to contact 77 from thence through wire 78 to shunt field 79 which is connected by wire 80 to lead wire 28 by its branch wire 28ª. This constantly energized shunt field 79 creates a magnetic field in which the armature of the main motor 10 revolves at all times. By placing a current absorbing means across the terminals of the armature of the main motor 10 a current will be generated by this armature which, although of short duration, is used effectively in several ways. In the first place, since the main motor 10 is acting as a generator, it will have a load placed upon it in proportion to the amount of current being generated and thereby acts as a brake to gradually stop the main motor 10 and press, and secondly, the dynamic force of the generator is used to actuate the knife 14, as previously stated.

Referring now in detail to the severing of the web X by the knife 14 in which the dynamic force of the main motor 10 when acting as a generator is used. As previously stated, the instant that the circuit to the main motor 10 is broken through the master switch 34 its relay 30 is de-energized which opens contacts 65 and 66 and closes contact 67 and at which time a shunt circuit is created through wire 71 to armature of the main motor 10 and from thence through wire 81 to a resistance or current absorbing means 82 which is connected by the closed contact 67 to wire 71.

The dynamic circuit for the web severing device includes the normally open switch 31 and solenoid 32 and wire 83 which leads from one side of resistance 82 to solenoid 32 from said solenoid through wire 84 to switch 31 from said switch through wire 85 to other side of resistance 82. The switch 31 is closed to energize the solenoid 32 and actuate the knife 14 to sever the web X simultaneously with the opening of master switch 34, which breaks the circuit for the main motor 10, by a solenoid 86 in the following circuit which includes contact 35 connected to a ground 87 by the bell-crank lever 20 when in operative position to break the circuit through master switch 34 to main motor 10. A wire 88 leads from contact 35 to solenoid 86 and from said solenoid through wire 89 to lead wire 28. Obviously, when the web X breaks it releases the actuator 19, the arm 25 engages the contact 35, completes the circuit for the solenoid 86 which, when energized, closes the switch 31 of the dynamic circuit that energizes the solenoid 32, attracts its plunger 36 and operates the knife 14 to sever the web X.

The wires 27 and 28 lead from a 220 volt system and the grounding of the arm 25 of the bell-crank 20 is the same as neutral in such a system and creates a 110 volt system for operating the solenoid 86.

In some instances a half-width web is run through the press, and hence, each unit, as shown, is equipped with two actuators 19 identical the one with the other and in the same circuit. Either one of these actuators 19 may be used depending on which side of the press the narrow web is being run on and the other actuator held inactive by electrically operated means 26. When running a full width web in the press unit both actuators 19 are used.

Figure 3:
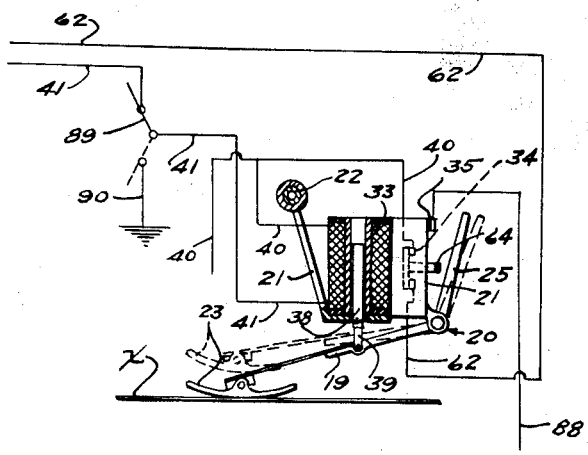
Fig. 3 is a view partly in elevation and partly in section taken on the line 3—3 of Fig. 1, on an enlarged scale, with some parts shown in different positions by broken lines.

The electrically operated means, shown in Fig. 3, for individually holding the switch actuators 19 inoperative in a plane above the web X includes a double-throw switch 89 interposed in the wire 41. To hold one of the actuators raised, it is only necessary to open the wire 41 by means of its switch 89 and ground said switch, as indicated at 90. When the switch 89 is on the ground 90 only half of the normal potential is going through the coil of the solenoid 33, but which is sufficient to hold the actuator 19 above the plane of the web X at all times whether the press is stopped or running.

Figure 6:
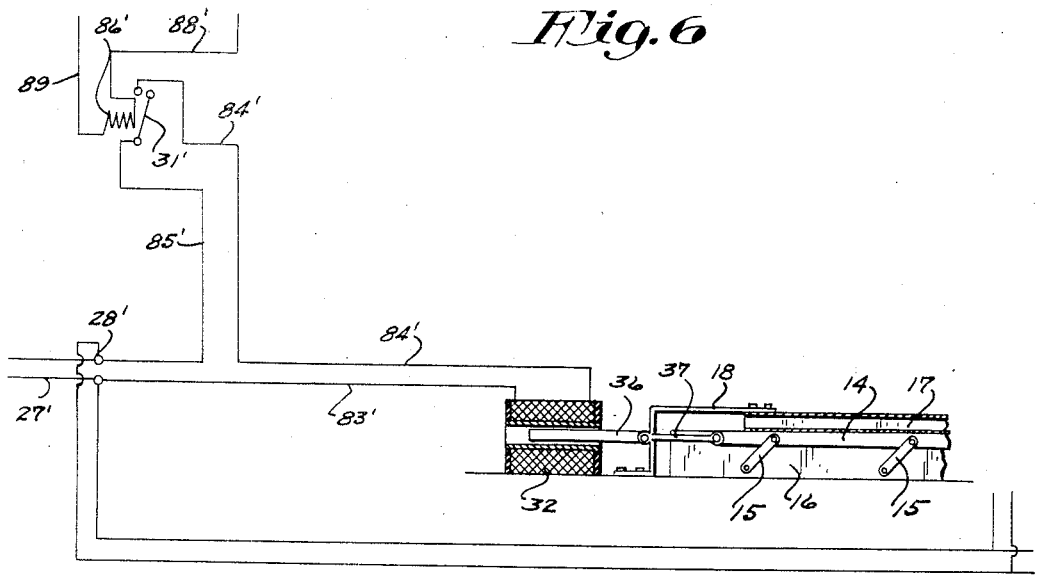
Fig. 6 shows a partial wiring diagram for the cutter operating means from an A. C. power line.

Referring now to the invention as shown in Fig. 6, the wiring is for an A. C. circuit and the parts thereof have the same reference numerals as corresponding parts in Figs. 1, 1ª, 2, 3, 4 and 5 except they are followed by a prime and it is important to note that the wires 83' and 85' lead directly from the power line 27' and 28' instead of from a shunt circuit, as in Fig. 1. It is, of course, understood in the wiring for an A. C. circuit, the shunt circuit shown in Fig. 1 would be dispensed with.

What we claim is:

1. In a machine of the class described having a web of sheet material arranged to travel therein, electrically operated means for driving the machine including a circuit having a circuit breaker, an actuator for the circuit breaker held inactive by the web when the machine is operating normally and arranged to be set in action by the breaking of the web to operate the circuit breaker so that the machine is stopped, and a second electrically operated means independent of the first noted electrically operated means arranged to be set in action by the operation of the circuit breaker at the time the web breaks for moving and holding the released actuator out of the normal plane of the web.

2. The structure defined in claim 1 in which the circuit breaker is automatically returned to normal position when the actuator is moved out of the normal plane of the web.

3. The structure defined in claim 1 in which the circuit breaker is automatically returned to normal position when the actuator is moved out of the normal plane of the web, said second noted electrically operated means being arranged to release the actuator onto the web when said web is replaced in the machine and said machine started and attained a predetermined speed.

4. In a machine of the class described having a web of sheet material arranged to travel therein, electrically operated means including a circuit having a circuit breaker for driving the machine at either a starting speed or a normal speed, an actuator for the circuit breaker held inactive by the web when the machine is operating at normal speed and arranged to be set in action by the breaking of the web to operate the circuit breaker so that the machine is stopped, and a second electrically operated means for holding the actuator out of the plane of the web when the machine is stopped or operating at slow speed and for releasing the actuator onto the web when the speed of the machine is changed from slow to normal speed.

5. In a machine of the class described having a web of sheet material arranged to travel therein, electrically operated means for driving the machine including a circuit having a circuit breaker, an actuator for the circuit breaker held inactive by the web when the machine is operating normally and arranged to be set in action by the breaking of the web to operate the circuit breaker so that the machine is stopped, and a second electrically operated means independent of the first noted electrically operated means for moving the actuator when released by the breaking of the web out of the normal plane of the web and for releasing the actuator onto the web when said web is replaced in the machine and said machine started and attained a predetermined speed and manually controlled means for holding the actuator out of the normal plane of the web.

6. In a machine of the class described having a web of sheet material arranged to travel therein, electrically operated means for driving the machine including a circuit having a circuit breaker, an actuator for the circuit breaker held inactive by the web when the machine is operating normally and arranged to be set in action by the breaking of the web to operate the circuit breaker so that the machine is stopped, and a second electrically operated means independent of the first noted electrically operated means for moving the actuator when released by the breaking of the web out of the normal plane of the web and for releasing the actuator onto the web when said web is replaced in the machine and said machine started and attained a predetermined speed and manually controlled means in the second electrically operated means for causing the same to hold the actuator out of the normal plane of the web at all times.

7. In a machine of the class described having a plurality of webs of sheet material arranged to travel therein, electrically operated means for driving the machine including a circuit having a circuit for each web, an actuator for each circuit breaker held inactive by the respective web when the machine is operating normally and arranged to be set in action by the breaking of said web to operate its circuit breaker so that the machine is stopped, and a second electrically operated means independent of the first noted electrically operated means for moving any one of the actuators when released by the breaking of the respective web out of the normal plane of said web, and manually controlled means for individually holding the actuators out of the normal plane of the respective webs.

8. In a machine of the class described having a plurality of webs of sheet material arranged to travel therein, electrically operated means for driving the machine including a circuit having a circuit breaker for each web, an actuator for each circuit breaker held inactive by the respective web when the machine is operating normally and arranged to be set in action by the breaking of said web to operate its circuit breaker so that the machine is stopped, and a second electrically operated means independent of the first noted electrically operated means for moving any one of the actuators when released by the breaking of the respective web out of the normal plane of said web, and manually controlled means in the second electrically operated means for causing the same to individually hold any one of the actuators out of the normal plane of the respective web at all times or for holding all of the actuators out of the normal plane of the webs at all times.

9. A machine of the class described having a web of sheet material arranged to travel therein, a double motor drive for operating the machine including an auxiliary electric motor and a main electric motor, a circuit breaker normally closing the circuit for the main motor, automatic means held inactive by the web and arranged to be set in action by the breaking of the web to operate the circuit breaker so that the machine is stopped, and electrically operated means including a normally closed circuit independent of the motor circuits for holding the automatic means inactive independent of the web and which circuit is automatically opened and closed with the opening and closing of the main motor circuit but in reverse order.

10. In a machine of the class described having a web of sheet material arranged to travel therein, an electric motor for operating the machine, a circuit breaker normally closing the circuit of the motor, automatic means held inactive by the web and arranged to be set in action by the breaking of the web to operate the circuit breaker and open the motor circuit so that the machine is stopped, and electrically operated means including a normally closed circuit independent of the motor circuit for holding the automatic means inactive independent of the web and which normally closed circuit is automatically opened and closed with the opening and closing of the motor circuit but in reverse order.

11. In a machine of the class described having a web of sheet material arranged to travel therein, a double motor drive for operating the machine including a contact assembly, an auxiliary motor and a main motor, said assembly normally breaking the circuits for said two motors, means for imparting a step of movement to the contact assembly to close the circuit for the auxiliary motor and for imparting a second step of movement thereto for breaking said circuit and closing the circuit for the main motor, a normally closed circuit breaker in the main motor circuit, a movable member contacting with the web and adapted to shift its position when the web is broken to operate the circuit breaker and open the circuit of the main motor so that the motor will stop, and electrically operated means including a circuit independent of the motor circuits and having a contact in said assembly for holding the movable member inoperative independent of the web when the circuit of the main motor is broken through the contact assembly, said contact being closed by said assembly when positioned to break the circuits for the two motors or close the circuit for the auxiliary motor and to open said contact when the assembly is operated to break the circuit for the auxiliary motor and close the circuit for the main motor.

12. In a machine of the class described having a web of sheet material arranged to travel therein, a double motor drive for operating the machine including a contact assembly, an auxiliary motor and a main motor, said assembly normally breaking the circuits of said two motors, means for imparting a step of movement to the contact assembly to close the circuit of the auxiliary motor and for imparting a second step of movement thereto for breaking said circuit of the auxiliary motor and closing the circuit for the main motor, a normally closed circuit breaker in the main motor circuit, an actuator for the circuit breaker resting upon the web and adapted to drop by gravity when the web breaks and open the circuit breaker so that the machine will be stopped and cause the automatic reset of the contact assembly, and electrically operated means including a circuit independent of the motor circuits and having a cooperating contact in said assembly for lifting the movable member after being released by the breaking of the web and for holding the same inactive above the normal plane of the web when said assembly is positioned to break the circuit of the two motors or close the circuit of the auxiliary motor and to open said contact when the assembly is operated to break the circuit of the auxiliary motor and close the circuit for the main motor to cause the movable member to drop by gravity onto the web.

CHARLES J. V. HENTSCHELL.
GEORGE H. WHELDON.